United States Patent
Sheu et al.

(10) Patent No.: US 12,086,213 B2
(45) Date of Patent: *Sep. 10, 2024

(54) GENERATING FUSED SENSOR DATA THROUGH METADATA ASSOCIATION

(71) Applicant: Pony AI Inc., Grand Cayman (KY)

(72) Inventors: Kevin Sheu, Fremont, CA (US); Jie Mao, Santa Clara, CA (US); Deling Li, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,380

(22) Filed: Jun. 30, 2023

(65) Prior Publication Data

US 2023/0350979 A1 Nov. 2, 2023

Related U.S. Application Data

(63) Continuation of application No. 16/938,600, filed on Jul. 24, 2020, now Pat. No. 11,693,927.

(51) Int. Cl.
*G06F 18/25* (2023.01)
*G01S 13/86* (2006.01)
(Continued)

(52) U.S. Cl.
CPC .......... *G06F 18/256* (2023.01); *G01S 13/865* (2013.01); *G01S 13/867* (2013.01);
(Continued)

(58) Field of Classification Search
CPC ........ G06F 18/256; G06F 18/22; G06F 18/25; G06F 18/214; G06F 18/24; G01S 13/865;
(Continued)

(56) References Cited

U.S. PATENT DOCUMENTS 8,548,269 B2 * 10/2013 Zargarpour ............ G03B 37/04
382/284
10,127,463 B2 11/2018 Fürsich
(Continued)

FOREIGN PATENT DOCUMENTS

EP 3438776 A1 2/2019
WO 2019195363 A1 10/2019

OTHER PUBLICATIONS

European Search Opinion for EP 21187354 recorded Dec. 21, 2021 (Year: 2021).

*Primary Examiner* — Calvin Cheung
(74) *Attorney, Agent, or Firm* — Sheppard, Mullin, Richter & Hampton LLP; Xin Xie

(57) ABSTRACT

Described herein are systems, methods, and non-transitory computer readable media for generating fused sensor data through metadata association. First sensor data captured by a first vehicle sensor and second sensor data captured by a second vehicle sensor are associated with first metadata and second metadata, respectively, to obtain labeled first sensor data and labeled second sensor data. A frame synchronization is performed between the first sensor data and the second sensor data to obtain a set of synchronized frames, where each synchronized frame includes a portion of the first sensor data and a corresponding portion of the second sensor data. For each frame in the set of synchronized frames, a metadata association algorithm is executed on the labeled first sensor data and the labeled second sensor data to generate fused sensor data that identifies associations between the first metadata and the second metadata.

20 Claims, 6 Drawing Sheets

(51) Int. Cl.
*G01S 17/89* (2020.01)
*G06T 11/20* (2006.01)
*G06V 20/56* (2022.01)

(52) U.S. Cl.
CPC .............. *G01S 17/89* (2013.01); *G06T 11/20* (2013.01); *G06V 20/56* (2022.01); *G06T 2200/04* (2013.01); *G06T 2210/12* (2013.01)

(58) Field of Classification Search
CPC ........ G01S 13/867; G01S 17/89; G01S 7/497; G01S 7/4802; G01S 7/4808; G01S 17/86; G01S 17/931; G06T 11/20; G06T 2200/04; G06T 2210/12; G06V 20/56; G06V 10/811
See application file for complete search history.

(56) References Cited

U.S. PATENT DOCUMENTS

| | | | |
|---|---|---|---|
| 10,210,399 B2 | 2/2019 | Sabeti | |
| 10,582,137 B1* | 3/2020 | Benemann | G01S 17/86 |
| 10,699,167 B1 | 6/2020 | Dowdall et al. | |
| 10,726,579 B1* | 7/2020 | Huang | G01S 7/4972 |
| 2016/0116593 A1 | 4/2016 | Kim et al. | |
| 2017/0028551 A1 | 2/2017 | Hemken | |
| 2017/0292836 A1* | 10/2017 | Jia | G01B 21/042 |
| 2017/0302889 A1 | 10/2017 | Koravadi | |
| 2018/0089538 A1 | 3/2018 | Graham et al. | |
| 2019/0108653 A1* | 4/2019 | Virodov | G06T 7/74 |
| 2019/0158813 A1* | 5/2019 | Rowell | H04N 13/111 |
| 2020/0098394 A1 | 3/2020 | Levinson et al. | |
| 2020/0174130 A1 | 6/2020 | Banerjee et al. | |
| 2021/0241026 A1* | 8/2021 | Deng | G01S 17/89 |

\* cited by examiner

GENERATING FUSED SENSOR DATA THROUGH METADATA ASSOCIATION

CROSS-REFERENCE TO RELATED APPLICATION

This application is a continuation of U.S. application Ser. No. 16/938,600, filed Jul. 24, 2020, the contents of which are incorporated herein by reference in its entirety.

BACKGROUND

The present invention relates generally to generating fused datasets, and more particularly, in some embodiments, to generating fused sensor data by associating metadata corresponding to first sensor data with metadata corresponding to second sensor data.

On-board sensors in a vehicle, such as an autonomous vehicle (AV), supplement and bolster the vehicle's FOV by providing continuous streams of sensor data captured from the vehicle's surrounding environment. Sensor data is used in connection with a diverse range of vehicle-based applications including, for example, blind spot detection, lane change assisting, rear-end radar for collision warning or collision avoidance, park assisting, cross-traffic monitoring, brake assisting, emergency braking, and automated distance control.

On-board vehicle sensors may include, for example, cameras, light detection and ranging (LiDAR)-based systems, radar-based systems, Global Positioning System (GPS) systems, sonar-based sensors, ultrasonic sensors, inertial measurement units (IMUs), accelerometers, gyroscopes, magnetometers, and far infrared (FIR) sensors. Sensor data may include image data, reflected laser data, or the like. Often, images captured by on-board sensors utilize a three-dimensional (3D) coordinate system to determine the distance and angle of objects in the image with respect to each other and with respect to the vehicle. In particular, such real-time spatial information may be acquired near a vehicle using various on-board sensors located throughout the vehicle, which may then be processed to calculate various vehicle parameters and determine safe driving operations of the vehicle.

Sensor data captured by different on-board sensors may be associated with various types of metadata. Such metadata may be associated at different points in time with sensor data captured by different sensors. This may make it difficult to establish a correspondence between sensor data from different sensors despite such sensor data relating to a same captured scene. Discussed herein are technical solutions that address this and other technical drawbacks associated with conventional techniques for manipulating sensor data.

SUMMARY

In an example embodiment, a computer-implemented method for fusing sensor data via metadata association is disclosed. The computer-implemented method includes capturing first sensor data using a first vehicle sensor and second sensor data using a second vehicle sensor and associating first metadata with the first sensor data to obtain labeled first sensor data and second metadata with the second sensor data to obtain labeled second sensor data. The method further includes performing a frame synchronization between the labeled first sensor data and the labeled second sensor data to obtain a set of frames, where each frame includes a respective portion of the labeled first sensor data and a corresponding respective portion of the labeled second sensor data. The method additionally includes executing, for each frame in the set of frames, a metadata association algorithm to the labeled first sensor data and the labeled second sensor data and generating, based at least in part on an output of executing the metadata association algorithm, fused sensor data from the labeled first sensor data and the labeled second sensor data.

In an example embodiment, the first sensor data is three-dimensional (3D) point cloud data and the second sensor data is two-dimensional (2D) image data.

In an example embodiment, associating the first metadata with the first sensor data to obtain the labeled first sensor data includes associating a 3D bounding box with a first object present in the 3D point cloud data, and associating the second metadata with the second sensor data to obtain the labeled second sensor data includes associating a 2D bounding box with a second object present in the 2D image data.

In an example embodiment, associating the first metadata with the first sensor data to obtain the labeled first sensor data and the second metadata with the second sensor data to obtain the labeled second sensor data further includes associating a first classification with the first object and a second classification with the second object.

In an example embodiment, each synchronized frame is associated with i) a respective set of 3D labels representative of a respective set of objects present in the respective portion of the 3D point cloud data and ii) a respective set of 2D labels representative of a respective set of objects present in the respective portion of the 2D image data.

In an example embodiment, the method further includes determining, for each synchronized frame, a respective set of similarity scores, where each similarity score in the respective set of similarity scores corresponds to a respective 3D label and a respective 2D label and represents a quantitative value indicative of a likelihood that the respective 3D label and the respective 2D label represent a same object in the synchronized frame.

In an example embodiment, the method further includes generating, for each synchronized frame, a respective scoring matrix comprising the respective set of similarity scores and determining that a particular 3D label and a particular 2D label form a matching label pair representative of a same particular object in the synchronized frame.

In an example embodiment, determining that the particular 3D label and the particular 2D label form the matching label pair includes determining that a particular similarity score between the particular 3D label and the particular 2D label is greater than each other similarity score associated with the particular 3D label and each other similarity score associated with the particular 2D label.

In an example embodiment, the fused sensor data includes an indication of the matching label pair.

In an example embodiment, the method further includes calibrating a set of extrinsics for the first vehicle sensor and the second vehicle sensor, the calibrated set of extrinsics including rotational and translational transformation data between the first vehicle sensor and the second vehicle sensor.

In an example embodiment, performing the frame synchronization includes performing the frame synchronization based at least in part on the calibrated set of extrinsics.

In an example embodiment, a system for fusing sensor data via metadata association is disclosed. The system includes at least one processor and at least one memory storing computer-executable instructions. The at least one processor is configured to access the at least one memory and execute the computer-executable instructions to perform a set of operations including capturing first sensor data using a first vehicle sensor and second sensor data using a second vehicle sensor and associating first metadata with the first sensor data to obtain labeled first sensor data and second metadata with the second sensor data to obtain labeled second sensor data. The set of operations further includes performing a frame synchronization between the labeled first sensor data and the labeled second sensor data to obtain a set of frames, where each frame includes a respective portion of the labeled first sensor data and a corresponding respective portion of the labeled second sensor data. The set of operations additionally includes executing, for each frame in the set of frames, a metadata association algorithm to the labeled first sensor data and the labeled second sensor data and generating, based at least in part on an output of executing the metadata association algorithm, fused sensor data from the labeled first sensor data and the labeled second sensor data.

The above-described system is further configured to perform any of the operations/functions and may include any of the additional features/aspects of example embodiments of the invention described above in relation to example computer-implemented methods of the invention.

In an example embodiment, a computer program product for fusing sensor data via metadata association is disclosed. The computer program product includes a non-transitory computer readable medium storing computer-executable program instructions that, when executed by a processing circuit, cause a method to be performed. In an example embodiment, the method includes capturing first sensor data using a first vehicle sensor and second sensor data using a second vehicle sensor and associating first metadata with the first sensor data to obtain labeled first sensor data and second metadata with the second sensor data to obtain labeled second sensor data. The method further includes performing a frame synchronization between the labeled first sensor data and the labeled second sensor data to obtain a set of frames, where each frame includes a respective portion of the labeled first sensor data and a corresponding respective portion of the labeled second sensor data. The method additionally includes executing, for each frame in the set of frames, a metadata association algorithm to the labeled first sensor data and the labeled second sensor data and generating, based at least in part on an output of executing the metadata association algorithm, fused sensor data from the labeled first sensor data and the labeled second sensor data.

The above-described computer program product is further configured to perform any of the operations/functions and may include any of the additional features/aspects of example embodiments of the invention described above in relation to example computer-implemented methods of the invention.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
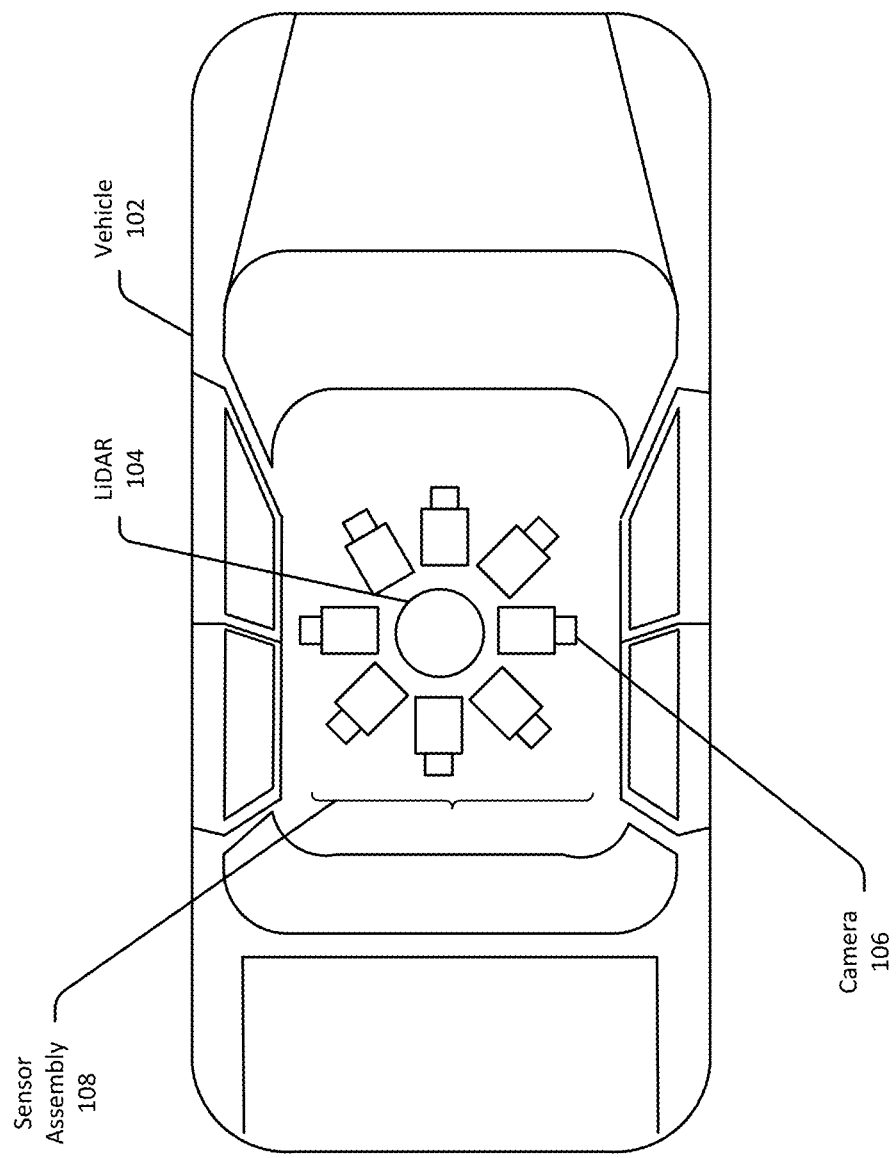
FIG. 1 is an aerial view of a sensor assembly that includes a LiDAR sensor and a plurality of cameras in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

In general, a vehicle (e.g., an autonomous vehicle, a driverless vehicle, etc.) can have a myriad of sensors onboard the vehicle. Such sensors can be disposed on an exterior or in an interior of a vehicle and can include, without limitation, LiDAR sensors, radars, cameras, GPS receivers, sonar-based sensors, ultrasonic sensors, IMUs, accelerometers, gyroscopes, magnetometers, FIR sensors, and so forth. Such sensors play a central role in the functioning and operation of an autonomous or driverless vehicle. For example, LiDARs can be utilized to detect objects (e.g., other vehicles, road signs, pedestrians, buildings, etc.) in an environment around a vehicle. LiDARs can also be utilized to determine relative distances between objects in the environment and between objects and the vehicle. As another non-limiting example, radars can be utilized in connection with collision avoidance, adaptive cruise control, blind spot detection, assisted parking, and other vehicle applications. As yet another non-limiting example, cameras can be utilized to capture images of an environment and object detection processing can be executed on the captured images to recognize, interpret, and/or identify objects in the images and/or visual cues of the objects. Cameras and other optical sensors can capture image data using charge coupled devices (CCDs), complementary metal oxide semiconductors (CMOS), or similar elements. Data collected from these sensors can be processed and used, as inputs, to algorithms configured to make various autonomous driving decisions including decisions relating to when and how much to accelerate, decelerate, change direction, or the like.

Various pre-processing may be performed on sensor data captured by different types of sensors before the sensor data is provided as input to algorithms, calculations, or the like that are executed/performed in connection with operations relating to autonomous vehicle operation, for example. For instance, sensor data captured by various sensors may be used as a training dataset to train one or more machine learning models/classifiers that may be used in connection with a range of tasks such as object detection, instance segmentation, 3D regression, vehicle navigation, and the like. In example scenarios, various metadata may need to be associated with the sensor data prior to the sensor data becoming usable as a training dataset. Such metadata may include, for example, labels that are assigned to/associated with the sensor data. The labels may include indicia that identify the locations of various objects present in the sensor data. Additionally, the labels may identify object types of the objects. In example scenarios, the labels may be manually associated with the sensor data to form the training dataset.

It is often the case that metadata is associated separately and at different times with sensor data from different sensors. For example, 3D point cloud data captured by a LiDAR sensor may be labeled separately than 2D image data captured by a camera. As a result, correspondence between the labeled 3D point cloud data and the labeled 2D image data may not be established. More specifically, a correspondence between labeled objects in the 3D data and labeled objects in the 2D data may not exist. This, in turn, creates a technical problem in fusing the 3D and 2D data to obtain a training dataset that can be used to train a deep learning model/classifier. In particular, conventional techniques for separately associating metadata (e.g., labels) with sensor data such as 2D and 3D sensor data present a technical problem relating to fusing the data because it is not known which labels in the 2D data and which labels in the 3D data correspond to the same objects.

Various embodiments of the invention overcome technical problems specifically arising in the realm of computer-based technology, and more specifically, in the realm of autonomous vehicle technology. In particular, example embodiments of the invention provide technical solutions to the above-described technical problem in the form of systems, methods, non-transitory computer-readable media, techniques, and methodologies for fusing different types of sensor data (e.g., 2D image data and 3D point cloud data) by associating respective metadata (e.g., labels) associated with the sensor data.

In example embodiments, first sensor data may be captured by a first vehicle sensor over some period of time. The first vehicle sensor may be, for example, a LiDAR sensor that captures 3D point cloud data representative of a sensed environment. The 3D point cloud data may include a collection of points that represent various 3D shapes/objects sensed within the environment scanned by the LiDAR. Each such point in the point cloud data may be associated with a corresponding (x, y, z) coordinate within a reference coordinate system. Similarly, over the same period of time, second sensor data may be captured by a second vehicle sensor. The second sensor data may be, for example, 2D image data captured by a camera or other type of image sensor. The 2D image data may include a collection of pixels, with each pixel having corresponding RGB values, for example.

In example embodiments, respective metadata may be associated with each of the 3D point cloud data and the 2D image data. In example embodiments, first metadata associated with the 3D point cloud data may be, for example, labels applied to objects detected in the 3D point cloud data. The labels may include, for example, a 3D bounding box (e.g., rectangular prism) formed around each object identified in the 3D point cloud data. Similarly, in example embodiments, second metadata may be associated with the 2D image data. The second metadata may be, for example, labels such as 2D bounding boxes (e.g., rectangles) formed around objects identified in the 2D image data. The labels may further include classifications of the objects in the 3D and 2D sensor data. For instance, each label applied to the 3D point cloud data may include a 3D bounding box formed around a corresponding object identified in the 3D data as well as an indication of the type of object (e.g., a vehicle, a pedestrian, a static object, etc.). Similarly, each label applied to the 2D image data may include a 2D bounding box formed around a corresponding object identified in the 2D data as well as an indication of the type of object. In some example embodiments, the object type identifier may be a code or the like that identifies the type of object.

As previously noted, the 2D image data and 3D point cloud data may be labeled separately from one another and potentially over the course of different time periods. As a result, a sufficient enough correspondence may not exist between the labeled 2D image data and the labeled 3D point cloud data to enable the 2D and 3D data to be fused and used as a combined training dataset to train a deep learning/machine learning model. That is, the labels assigned to the 3D data may not be linked or associated with the labels assigned to the 2D image data, and as such, it may not be possible to determine if an object labeled in the 3D data is a same object labeled in the 2D data.

Example embodiments of the invention provide a technical solution to this technical problem by performing a frame synchronization of the labeled 3D point cloud data and the labeled 2D image data to obtain a set of synchronized frames, where each synchronized frame corresponds to a frame of the 2D image data and a corresponding frame of the 3D point cloud data when the camera and the LiDAR are capturing the same portion of a scene. Because the LiDAR and the camera occupy different positions on the vehicle and each have a different field-of-view (FOV) and a different data frame capture rate, a set of extrinsics may be calibrated for the LiDAR and the camera and used along with timing data from the LiDAR and camera to perform the frame synchronization. The calibrated set of extrinsics may include rotational and translational information that, along with timing data, allows for data frames captured by the LiDAR to be aligned with image frames captured by the camera to ensure that a LiDAR data frame and an image frame, when synchronized, correspond to data captured from the same (or substantially the same) portion of a scene over the same (or substantially the same) period of time.

After the frame synchronization is performed, a set of synchronized frames is obtained, where each synchronized frame corresponds to a particular image frame of the 2D image data and a particular data frame of the 3D point cloud data and is associated with a set of labels assigned to the particular image frame and a set of labels assigned to the particular data frame of the 3D point cloud data. Then, a metadata association algorithm, or more specifically, a label association algorithm may be executed on the set of synchronized frames on a frame-by-frame basis to fuse the 2D image data and the 3D point cloud data.

In example embodiments, executing the label association algorithm for a particular synchronized frame, that is, a particular data frame captured by the LiDAR and a particular 2D image frame synchronized with the particular LiDAR frame, may include determining a set of similarity scores between the 2D labels associated with the particular 2D image frame and the 3D labels associated with the particular LiDAR frame. More specifically, a respective similarity score may be determined between each pair of 2D label and 3D label. The similarity score may be based on various parameters including, without limitation, the object type of the object corresponding to the label, the shape of the labeled object, the location of the labeled object within the frame, and so forth. Then, a similarity score matrix may be generated that contains the set of determined similarity scores. In some example embodiments, matching pairs of 2D and 3D labels may be identified by selecting, for each 2D label, the 3D label with which the 2D label has the highest similarity score or vice versa. In some example embodiments, a matching pair may only be identified if the corresponding similarity score of the matching pair satisfies (e.g., meets or exceeds) a threshold score. Thus, in some example embodiments, one of more 2D labels may remain unmatched if there is no 3D label with which the 2D label has a similarity score that satisfies the threshold score. The converse is true as well. That is, one or more 3D labels may remain unmatched if there is no 2D label with which the 3D label has a similarity score that satisfies the threshold score.

In example embodiments, after the label association algorithm is executed and matching label pairs of 2D and 3D labels are identified, the 2D and 3D data can be fused to form, for example, a training dataset for training a machine learning model. Constituent members of a matching label pair (e.g., a 2D label and a 3D label) may be presumed to correspond to a same sensed object. Thus, fused 2D and 3D sensor data that is indicative of matching 2D and 3D labels provides a richer training dataset for use in training a machine learning model, and thus, results in an improved learning model that is capable of performing its designated classification task across a broader range of potential types of objects and/or with improved accuracy. Thus, example embodiments of the invention that provide techniques and algorithms for associating first metadata (e.g., labels) assigned to first sensor data captured by a first sensor with second metadata assigned to second sensor data captured by a second sensor of a different type than the first sensor result in enhanced fused sensor data that improves the training of a machine learning model that relies on the fused sensor data. Thus, example embodiments of the invention that produce enhanced fused sensor data results in an improvement to a technological field, in particular, the technical field of sensor data fusion and machine learning. This technological improvement provides a technical solution to the technical problem posed by sensor data from different sensors being labeled separately such that there is no established correspondence between the different labeled sensor data, thereby making it difficult to generate fused sensor data that can be used as a training dataset.

In example embodiments, the metadata/label association algorithm described herein may be executed in real-time during operation of a vehicle such as an autonomous vehicle or may executed offline on labeled 2D/3D data generated by labelers tasked with labeling the 3D point cloud data and 2D image data. For instance, in some example embodiments, 3D point cloud data and 2D image data may be manually labeled offline and the metadata/label association algorithm may be executed offline on the manually labeled data.

FIG. 1 is an aerial view of a sensor assembly 108 in accordance with an example embodiment of the invention. The sensor assembly 108 may include a variety of different types of sensors including, for example, one or more LiDAR sensors 104 and one or more cameras 106. Although not depicted in FIG. 1, the sensor assembly 108 may further include other types of sensors such as, for example, one or more IMUs, one or more GPS receivers, and so forth. In the example configuration depicted in FIG. 1, the LiDAR sensor 104 is centrally located on a roof of a vehicle 102 and is surrounded by multiple cameras that are positioned circumferentially around the LiDAR sensor 104. In example embodiments, the LiDAR sensor 104 may periodically rotate through a scan path during which the LiDAR 104 may illuminate objects in the scanned environment with periodic pulses of light and measure the differences in flight times and wavelengths for light that is reflected back to detect the presence of target objects, determine distances between the vehicle 102 and the target objects, determine distances between various target objects in the sensed environment, and the like. More specifically, the LiDAR 104 may be configured to generate digital 3D representations of targets that were illuminated by the light pulses based on the measured differences in flight times and wavelengths for light that is reflected. More specifically, a LiDAR sensor may generate a 3D point cloud (a set of data points in space) representative of a target object that it has illuminated with light during its scan path. The LiDAR 104 may exhibit a horizontal scan path and/or a vertical scan path.

In example embodiments, as the LiDAR 104 travels through its scan path, it may become aligned with each camera 106 of the sensor assembly at a respective particular point in time. In order to perform the data frame synchronization described herein between the 3D point cloud data captured by the LiDAR 104 and the 2D image data captured by the cameras 106, a calibrated set of extrinsics may be determined. In addition, timing data received from the LiDAR 104 and the cameras 106 (e.g., shutter times/speeds of the cameras 106, timestamps for LiDAR scans, etc.) may be utilized. The set of extrinsics may provide various rotational and translational information that can be used in conjunction with the timing data to determine relative positioning of the LiDAR 104 with respect to any given camera 106 at any point in time, thereby allowing for each LiDAR data frame to be matched with corresponding image frame capturing a same portion of the sensed environment at a same point in time, and as a result, syncing the LiDAR data frame with the 2D camera image frame. In addition, in accordance with example embodiments of the disclosure, the calibrated set of extrinsics may be used in connection with execution of the label association algorithm to determine the location of 2D labels in 3D space and the location of 3D labels in 2D space.

Figure 2:
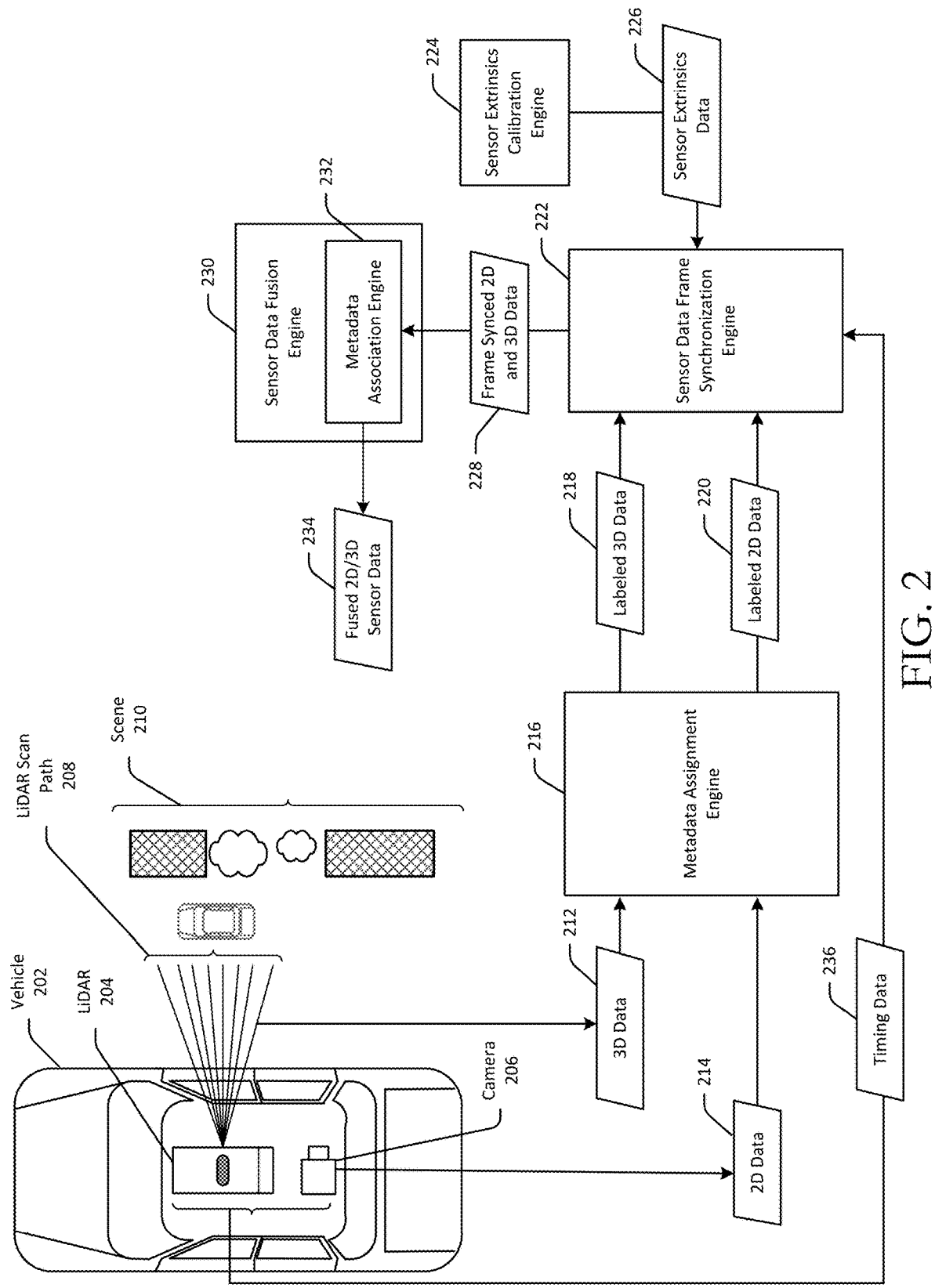
FIG. 2 is a hybrid data flow and block diagram illustrating fusion of labeled two-dimensional (2D) and three-dimensional (3D) sensor data in accordance with an example embodiment of the invention.
Figure 3:
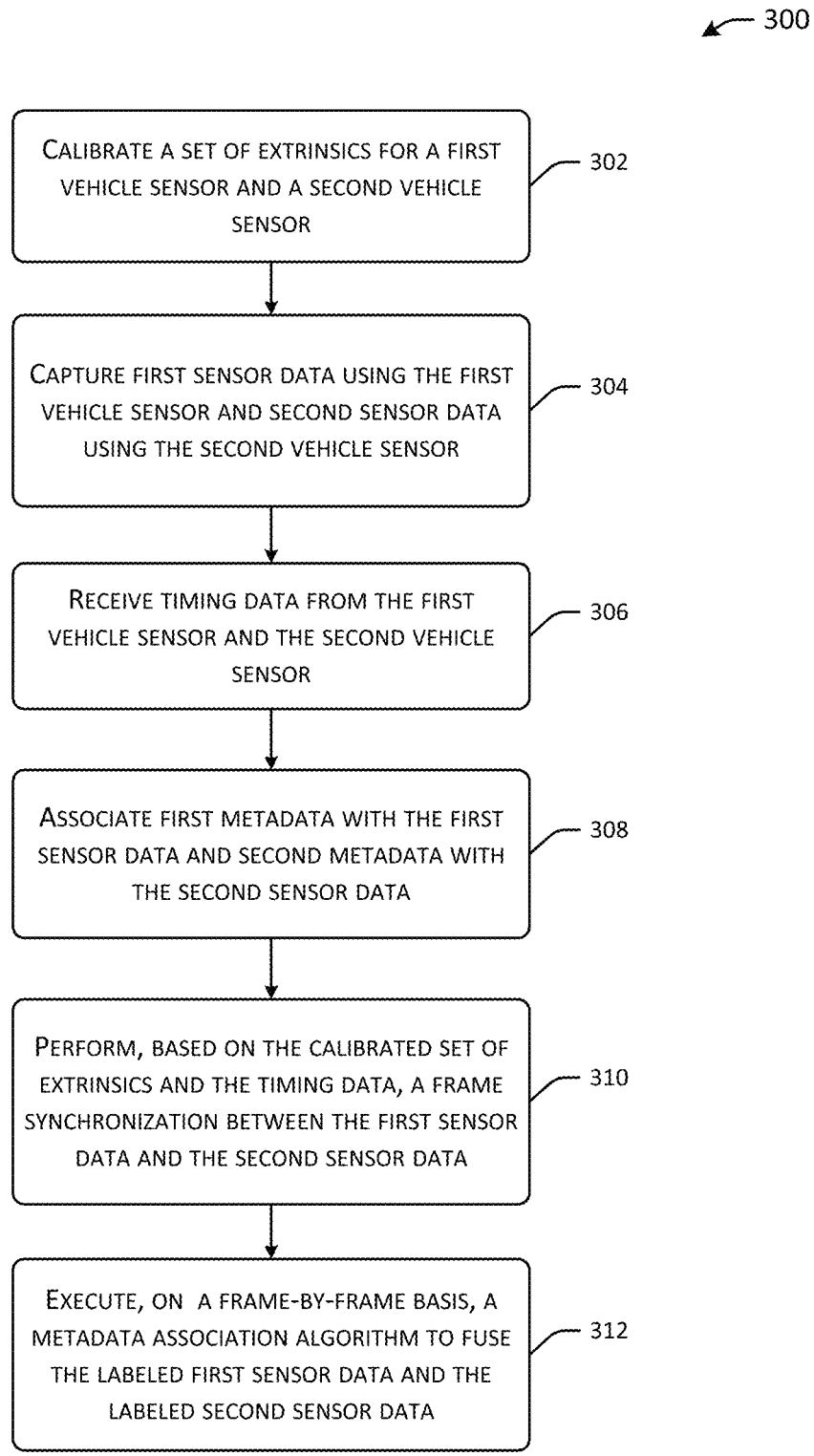
FIG. 3 is a process flow diagram of an illustrative method for sensor data fusion through metadata association in accordance with an example embodiment of the invention.
Figure 4:
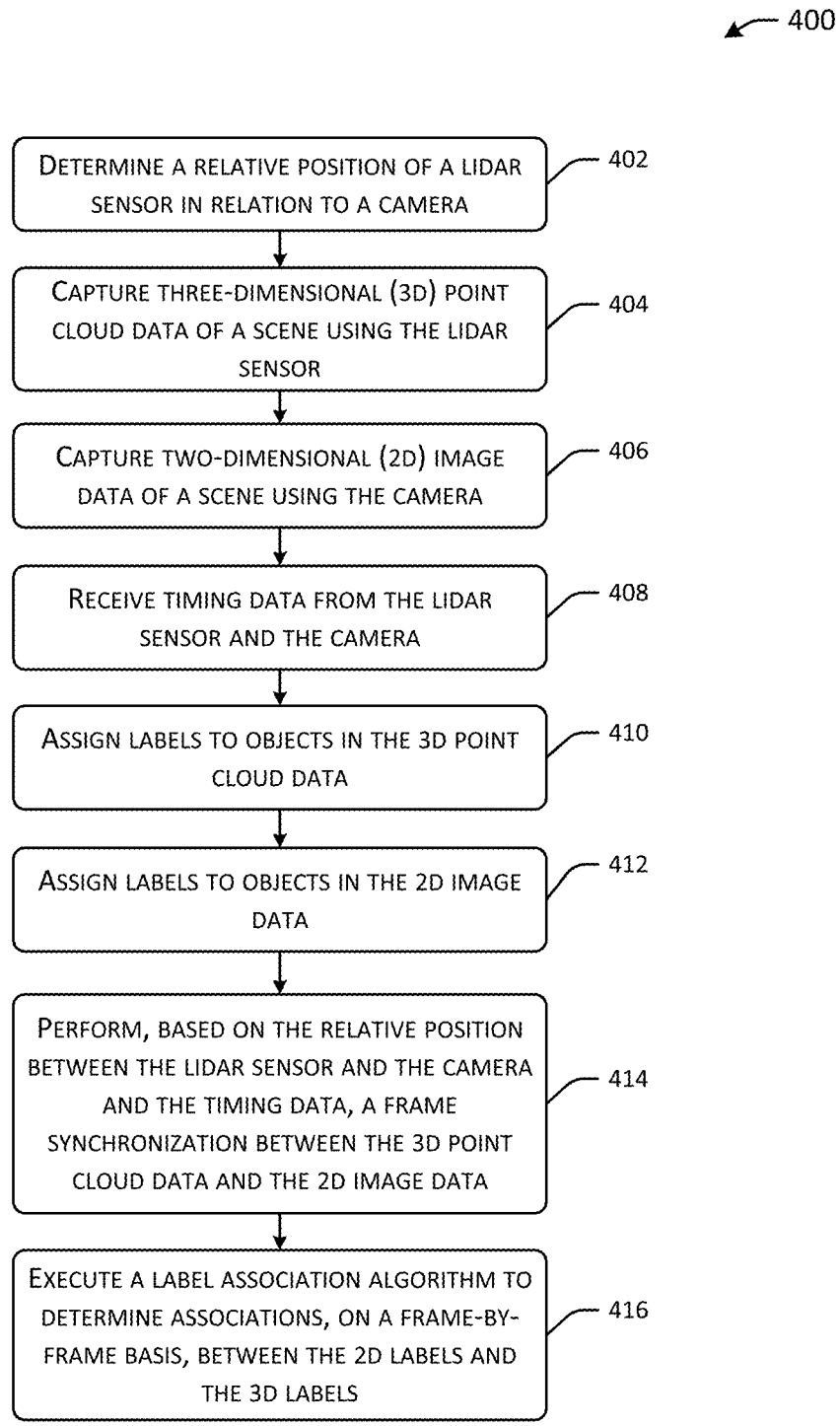
FIG. 4 is a process flow diagram of an illustrative method for fusing labeled two-dimensional (2D) and three-dimensional (3D) sensor data in accordance with an example embodiment of the invention.
Figure 5:
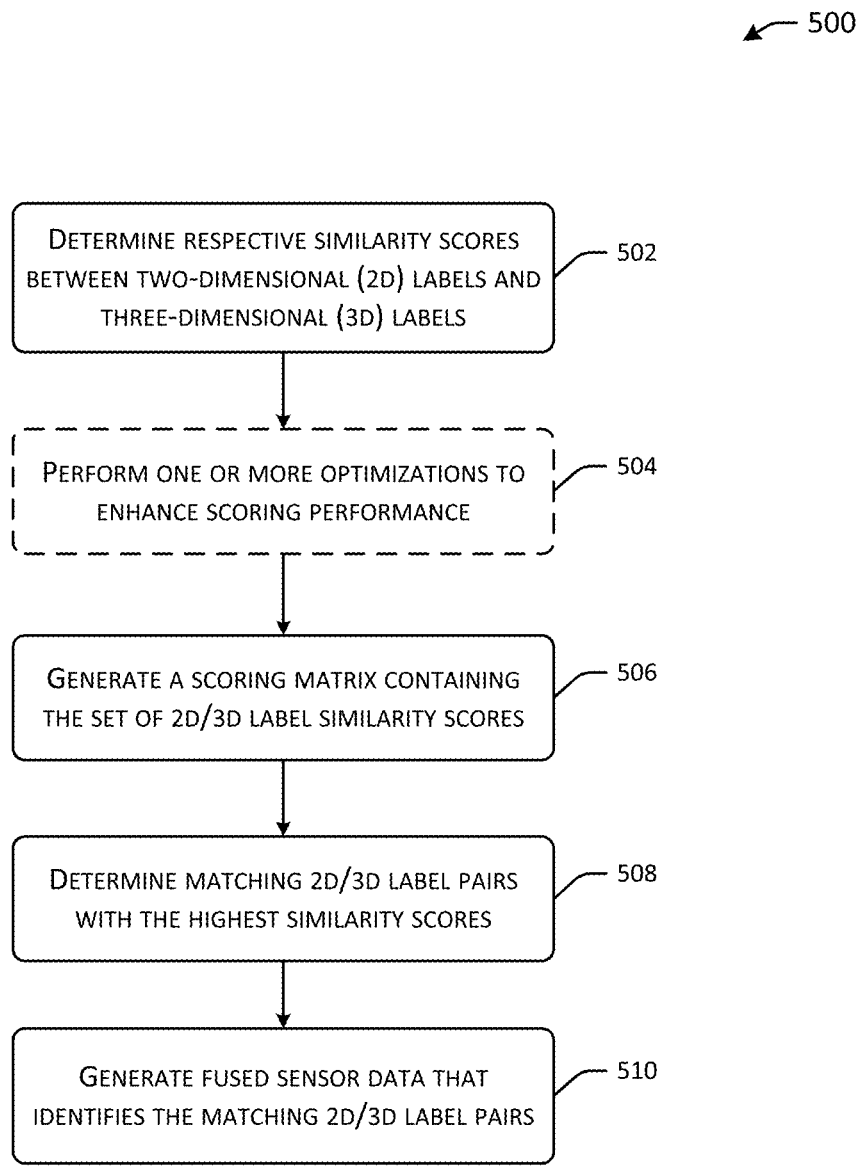
FIG. 5 is a process flow diagram of an illustrative method for executing a sensor data label association algorithm in accordance with an example embodiment of the invention.

FIG. 2 is a hybrid data flow and block diagram illustrating fusion of labeled two-dimensional (2D) and three-dimensional (3D) sensor data in accordance with an example embodiment of the invention. FIG. 3 is a process flow diagram of an illustrative method 300 for sensor data fusion through metadata association in accordance with an example embodiment of the invention. FIG. 4 is a process flow diagram of an illustrative method 400 for fusing labeled two-dimensional (2D) and three-dimensional (3D) sensor data in accordance with an example embodiment of the invention. FIG. 5 is a process flow diagram 500 of an illustrative method for executing a sensor data label association algorithm in accordance with an example embodiment of the invention. Each of FIGS. 3-5 will be described in conjunction with FIG. 2 hereinafter.

Each operation of any of the methods 300-500 can be performed by one or more of the engines/program modules depicted in FIG. 2 or in FIG. 6, whose operation will be described in more detail hereinafter. These engines/program modules can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. In example embodiments, these engines/program modules may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring first to FIG. 2, a vehicle 202 is depicted. The vehicle 202 may be any suitable type of vehicle including, without limitation, a car; a truck; a two-wheeled vehicle such as a motorcycle, moped, scooter, or the like; a vehicle with more than two axles (e.g., a tractor trailer); and so forth. The vehicle 202 include various on-board vehicle sensors such as a LiDAR 204 and one or more cameras 206. In example embodiments, the vehicle 202 may be the vehicle 102 and the LiDAR 204 and camera 206 may form part of the sensor assembly 108 depicted in FIG. 1.

Referring now to FIG. 3 in conjunction with FIG. 2, at block 302 of the example method 300, a sensor extrinsics calibration engine 224 may be executed to calibrate extrinsics for a first vehicle sensor (e.g., the LiDAR 204) and a second vehicle sensor (e.g., the camera 206). The sensor extrinsics calibration engine 224 may generate sensor extrinsics data 226. The data 226 may include rotational and translational information (e.g., rotational and translational matrices) that determines a relative position of the first sensor with respect to the second sensor. The sensor extrinsics data 226 can be used, along with timing data from the sensors, to perform a data synchronization between 3D data frames captured by the LiDAR 204 and 2D image frames captured by the camera 206 as well as to locate 2D labeled objects in 3D space and vice versa, as will be described in further detail later in this disclosure.

At block 304 of the method 300, first sensor data may be captured by the first vehicle sensor and second sensor data may be captured by the second vehicle sensor. The first sensor data may be 3D point cloud data 212 captured by the LiDAR 204 during its scan path. The second sensor data may be 2D image data 214 captured by the camera 206. Both the 3D data 212 and the 2D data 214 may correspond to various portions of a scene 210 sensed by the sensors, which may include various different types of objects.

At block 306 of the method 300, timing data 236 may be received from the first vehicle sensor and the second vehicle sensor. For instance, timing data may be received from the LiDAR 204 in the form of timestamps associated with vertical and/or horizontal scans performed by the LiDAR 204 as it travels along the scan path 208. Timing data received from the camera 206 may include, for example, shutter times/speeds indicative of the amount of time (e.g., number of milliseconds) that it takes for the camera 206 to capture an image.

At block 308 of the method 300, a metadata assignment engine 216 may be executed to associate first metadata with the first sensor data and second metadata with the second sensor data. Associating the first metadata with the first sensor data may include assigning labels to the 3D point cloud data 212 to obtained labeled 3D data 218. Associating the second metadata with the second sensor data may include assigning labels to the 2D image data 214 to obtain labeled 2D data 220. As will be described in more detail later in this disclosure, the labels assigned to the 3D data 212 may include 3D bounding boxes formed around objects identified in the 3D data 212, object type classifications/identifiers assigned to the identified objects, and so forth. Similarly, the labels assigned to the 2D image data 214 may include 2D bounding boxes formed around objects identified in the 2D data 214, object type classifications/identifiers assigned to the identified objects, and so forth.

At block 310 of the method 300, a sensor data frame synchronization engine 222 may be executed to perform a frame synchronization between the first sensor data (e.g., the 3D data 212 or the labeled 3D data 218) and the second sensor data (e.g., the 2D data 214 or the labeled 2D image data 220) using the sensor extrinsics data 226 in conjunction with the timing data 236 to obtain frame synced data 228. While the frame synchronization performed at block 310 is illustratively depicted in FIGS. 2 and 3, for example, as occurring after the metadata assignment at block 308, this may not be case. That is, in example embodiments, labeling of the 2D and 3D data is not necessary to perform the frame synchronization, and thus, the frame synchronization may occur prior to, after, and/or at least partially concurrently with the metadata assignment (e.g., the labeling of the 2D/3D data). For ease of explanation, however, the frame synchronization will be described hereinafter as occurring after the labeling of the 2D and 3D data and as being performed on the labeled data.

The frame synced data 228 may include a collection of synced frames in which each 3D data frame in the labeled 3D data 218 is synced with a respective corresponding image frame of the labeled 2D image data 220. A 3D data frame synced with a 2D image frame may indicate that the frames correspond to sensor data captured from a same or substantially a same portion of the scene 210 at the same or substantially the same period of time, and thus, that the LiDAR 204 that generated the 3D data in the 3D data frame and the camera 206 that generated the image data in the 2D image frame were positionally aligned at that period of time. It should be appreciated that a 3D data frame of the labeled 3D point cloud data 218 may be frame synced with multiple 2D image frames. Each synced frame in the frame synced data 228 may be associated with a set of 2D labels associated with a corresponding 2D image frame and a set of 3D labels associated with a 3D data frame synced with the 2D image frame.

Finally, at block 312 of the method 300, a metadata association engine 232 may execute a metadata association algorithm on the frame synced data 228 on a frame-by-frame basis to fuse the labeled first sensor data (e.g., the labeled 3D data 218) and the labeled second sensor data (e.g., the labeled 2D data 220) and generate fused sensor data 234. Executing the metadata association algorithm for a given synced frame of the frame synced data 228 may include determining one or more matching 2D/3D label pairs, where each matching 2D/3D label pair corresponds to a same object in the sensed environment. Execution of the metadata associated algorithm will be described in more detail later in this disclosure.

The example method 400 provides a more specific implementation of metadata association techniques described herein with respect to 3D point cloud data captured by the LiDAR 204 and 2D image data captured by the camera 206. Referring now to FIG. 4 in conjunction with FIG. 2, at block 402 of the method 400, a relative position between the LiDAR 204 and the camera 206 may be determined. In some example embodiments, the relative positioning of the LiDAR 204 with respect to the camera 206 may be determined by executing the sensor extrinsics calibration engine 224 to determine the sensor extrinsics data 226, which may include translational and rotational data that can be used to determine a relative alignment/positioning between the LiDAR 204 and the camera 204 at any given point in time.

At block 404 of the method 400, the 3D point cloud data 212 corresponding to various portions of the scene 210 may be captured using the LiDAR 204. The 3D point cloud data 212 may include data captured by the LiDAR 206 as it traverses a scan path 208, which may be a vertical scan path and/or a horizontal scan path. It should be appreciated that the LiDAR 204 may traverse a scan path that includes a 360 degree rotation, and that the scan path 208 may represent only a portion of the total scan path of the LiDAR 204, and thus, the scene 210 may represent only a portion of the total environment sensed by the LiDAR 204.

The 3D point cloud data 212 may include a collection of points that represent various 3D shapes/objects sensed within the environment scanned by the LiDAR 204 including the scene 210. Each such point in the point cloud data 212 may be associated with a corresponding (x, y, z) coordinate within a reference coordinate system. In example embodiments, the reference coordinate system may be centered at a location of the LiDAR 204 with respect to the vehicle 202, at an origin of a global coordinate system, or the like.

At block 406 of the method 400, the 2D image data 214 corresponding to various portions of the scene 210 may be captured using the camera 206. It should be appreciated that multiple cameras 206 forming part of the sensor assembly 108 (FIG. 1), for example, may capture the 2D image data 214. The 2D image data 214 may include a collection of pixels, with each pixel having corresponding RGB values, for example.

At block 408 of the method 400, respective timing data 236 may be received from each of the LiDAR sensor 204 and the camera 206. The timing data received from the LiDAR may include timestamps associated with vertical and/or horizontal scans performed by the LiDAR 204 as it travels along the scan path 208. For example, a set of timestamps may be received for each scan of the LiDAR 204 including a first timestamp indicative a start time of the scan and a second timestamp indicating an end time of the scan. Timing data received from the camera 206 may include, for example, shutter times/speeds indicative of the amount of time (e.g., number of milliseconds) that it takes for the camera 206 to capture an image.

At block 410 of the method 400, the metadata assignment engine 216 may be executed to assign labels to the 3D point cloud data 212 to obtain labeled 3D point cloud data 218. More specifically, the metadata assignment engine 216 may be executed to assign labels to objects identified in the 3D point cloud data 212. Further, at block 412 of the method 400, the metadata assignment engine 216 may be executed to assign labels to the 2D image data 214 to obtain labeled 2D image data 220. More specifically, the metadata assignment engine 216 may be executed to assign labels to objects identified in the 2D data 220.

In example embodiments, labels applied to objects detected in the 3D point cloud data 212 may include, for example, a 3D bounding box (e.g., rectangular prism) formed around each object identified in the 3D point cloud data 212. In example embodiments, each such 3D bounding box may be defined by a set of coordinates within a coordinate system. For instance, if the bounding box is a rectangular prism, the bounding box may be defined by a minimum of two coordinates: a first coordinate representing a particular corner of the rectangular prism and a second coordinate that opposes the first coordinate along a length, width, and depth of the rectangular prism. While a greater number of coordinates may be specified, only these 2 particular coordinates are needed to fully define a rectangular prism bounding box within a coordinate system. In other example embodiments, other 3D structures (e.g., a spherical structure) may be used as a 3D bounding box.

Similarly, in example embodiments, the labels associated with the 2D image data 214 may include 2D bounding boxes such as rectangles formed around objects identified in the 2D image data 214. In example embodiments, each such 2D bounding box may be defined by a set of coordinates within a coordinate system. For instance, if the bounding box is a rectangle, the bounding box may be defined by a minimum of two coordinates: a first coordinate representing a particular corner of the rectangle (e.g., an upper left corner of the rectangle) and a second coordinate representing an opposing corner of the rectangle (e.g., a lower right corner of the rectangle).

The 3D labels and/or the 2D labels may further include classifications of the objects in the respective 3D data 212 and 2D data 214. For instance, each label applied to the 3D point cloud data 212 may include a 3D bounding box formed around a corresponding object identified in the 3D data 212 as well as an indication of the type of object (e.g., a vehicle, a pedestrian, a static object, etc.). Similarly, each label applied to the 2D image data 214 may include a 2D bounding box formed around a corresponding object identified in the 2D data 214 as well as an indication of the type of object. In some example embodiments, the object type identifier may be a code or the like that identifies the type of object.

At block 414 of the method 400, sensor data frame synchronization engine 222 may be executed to perform, based on the sensor extrinsics data 226 (e.g., the relative position between the LiDAR 204 and the camera 206) and the timing data 236, a frame synchronization between the labeled 3D point cloud data 218 and the labeled 2D image data 220 to obtain frame synced data 228. The calibrated sensor extrinsics data 226 may include rotational and translational information that allows for data frames captured by the LiDAR 204 to be aligned with image frames captured by the camera 206 to ensure that a LiDAR data frame and an image frame, when synchronized, correspond to data captured from the same (or substantially the same) portion of the scene 210 over the same (or substantially the same) period of time. In example embodiments, each synced frame in the frame synced data 228 may be associated with a set of 2D labels assigned to a corresponding 2D image data frame in the labeled 2D image data 220 and a set of 3D labels assigned to a corresponding 3D LiDAR data frame in the labeled 3D data 218 that has been synced with the 2D image frame. As previously noted, the frame synchronization may alternatively occur prior to and/or at least partially concurrently with the assignment of the 2D and 3D labels to the 2D image data 214 and 3D data 212, respectively, in which case, the frame synchronization may be performed between at least partially unlabeled 3D point cloud data 212 and at least partially unlabeled 2D image data 214 to obtain the frame synced data 228. In such example embodiments, at least some of the 2D and/or 3D labels may be assigned to the 2D data 214 and 3D data 212, respectively, after the frame synchronization is performed. That is, in some example embodiments, at least some of the 2D and/or 3D labels may be assigned to the frame synced data 228.

At block 416 of the method 400, the metadata association engine 232 may execute a label association algorithm on the frame synced data 228 on a per frame basis to determine associations between the 2D labels and the 3D labels and generate corresponding fused 2D/3D sensor data 234 indicative of the determined associations. FIG. 5 depicts an example method 500 representing a particular implementation of the label association algorithm executed at block 414 of the method 400 for a particular synced data frame.

Referring now to FIG. 5, at block 502 of the method 500, the metadata association engine 232 may execute the label association algorithm to determine respective similarity scores between 2D labels (e.g., 2D bounding boxes) associated with the synced data frame and 3D labels (e.g., 3D bounding boxes) associated with the synced data frame. That is, for a particular synchronized frame, e.g., a particular 3D data frame captured by the LiDAR 204 and a particular 2D image frame captured by the camera 206 and synchronized with the particular LiDAR frame, the metadata association engine 232 may determine a set of similarity scores between the 2D labels associated with the particular 2D image frame and the 3D labels associated with the particular LiDAR frame. More specifically, a respective similarity score may be determined between each pair of 2D label and 3D label.

In example embodiments, each similarity score may be a quantitative value indicative of a likelihood that a 2D bounding box and a 3D bounding box to which the similarity score corresponds represents the same object.

In example embodiments, the similarity score may be based on various parameters including, without limitation, the object type of the object corresponding to the label, the shape of the labeled object, the location of the labeled object within the frame, and so forth. In some example embodiments, the sensor extrinsics data 226 including the rotational and translational data included therein may be used to locate a 2D object labeled in the 2D image frame in the 3D space of the 3D LiDAR data frame. This may include extrapolating the 2D object to a corresponding 3D object in the 3D space. Similarly, the sensor extrinsics data 226 may be used to locate a 3D object labeled in the 3D LiDAR data frame in the 2D space of the 2D image frame.

Optionally, at block 504 of the method 500, the metadata association engine 232 may perform one or more optimizations to enhance the performance of the label association algorithm. An example optimization may be to cease determining additional similarity scores for a particular 2D label or a particular 3D label after some threshold number of previously determined similarity scores are below a threshold score value. Another example optimization may be to cease determining additional similarity scores for a particular 2D label or a particular 3D label after a similarity score above a threshold score value is determined. It should be appreciated that the above examples of potential optimizations are merely illustrative and not exhaustive.

Then, at block 506 of the method 500, a similarity score matrix may be generated that contains the set of determined similarity scores. At block 508 of the method 500, matching pairs of 2D and 3D labels may be identified by selecting, for each 2D label, the 3D label with which the 2D label has the highest similarity score or vice versa. In some example embodiments, a matching pair may only be identified if the corresponding similarity score of the matching pair satisfies (e.g., meets or exceeds) a threshold score. Thus, in some example embodiments, one of more 2D labels may remain unmatched if there is no 3D label with which the 2D label has a similarity score that satisfies the threshold score. The converse is true as well. That is, one or more 3D labels may remain unmatched if there is no 2D label with which the 3D label has a similarity score that satisfies the threshold score.

In example embodiments, after the label association algorithm is executed and matching label pairs of 2D and 3D labels are identified, the 2D and 3D data can be fused at block 510 of the method 500 to form fused sensor data 234 that can be used, for example, as a training dataset for training a machine learning model. Constituent members of a matching label pair (e.g., a 2D label and a 3D label) may be presumed to correspond to a same sensed object. Thus, fused 2D and 3D sensor data 234 that is indicative of matching 2D and 3D labels provides a richer training dataset for use in training a machine learning model, and thus, results in an improved learning model that is capable of performing its designated classification task across a broader range of potential types of objects and/or with improved accuracy.

Hardware Implementation

Figure 6:
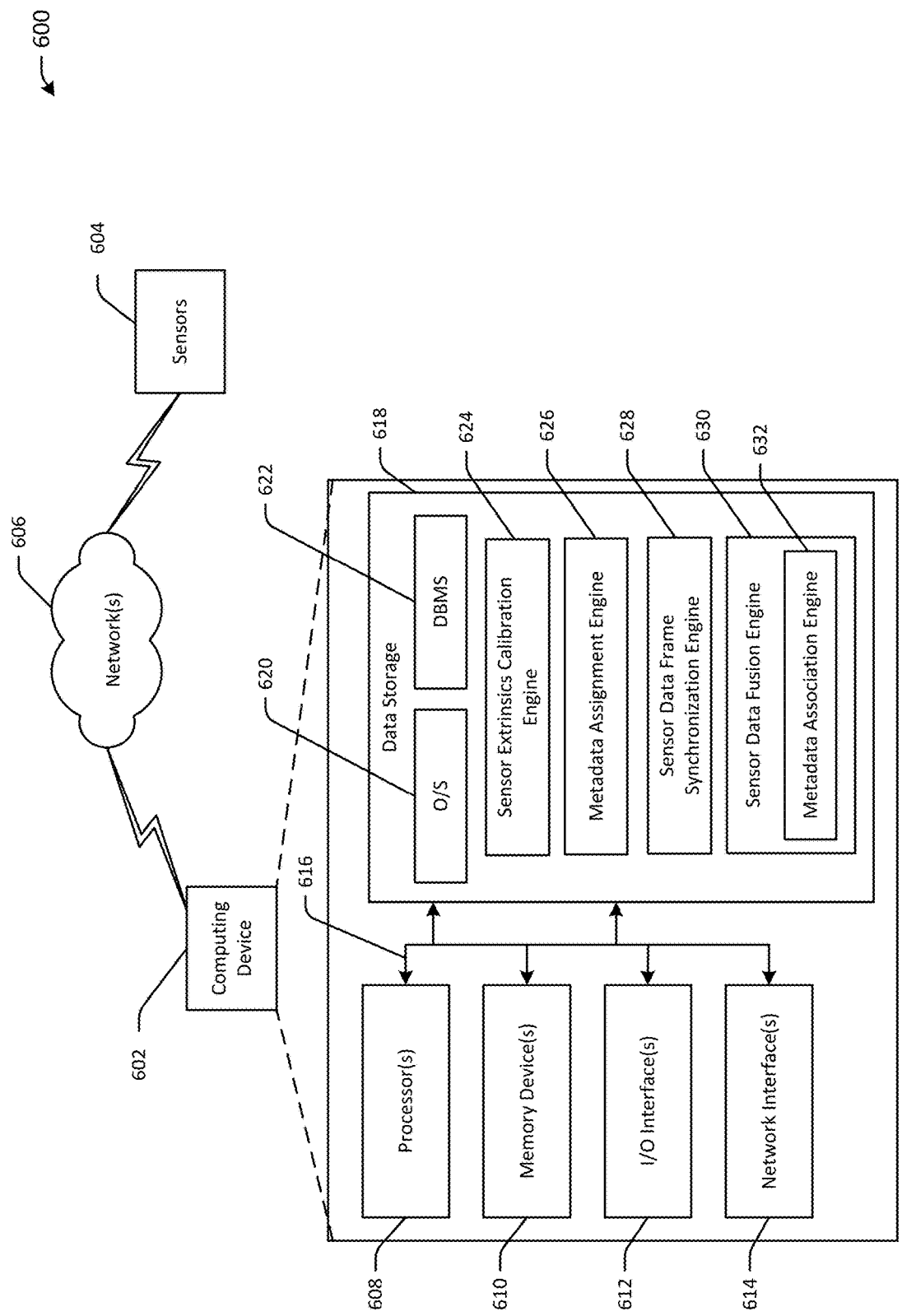
FIG. 6 is a schematic block diagram illustrating an example networked architecture configured to implement example embodiments of the invention.

FIG. 6 is a schematic block diagram illustrating an example networked architecture 600 configured to implement example embodiments of the invention. The networked architecture 600 can include one or more special-purpose computing devices 602 communicatively coupled via one or more networks 606 to various sensors 604. The sensors 604 may include any of the example types of on-board vehicle sensors previously described including, without limitation, LiDAR sensors, radars, cameras, GPS receivers, sonar-based sensors, ultrasonic sensors, IMUs, accelerometers, gyroscopes, magnetometers, FIR sensors, and so forth. In example embodiments, the sensors 604 may include on-board sensors provided on an exterior or in an interior of a vehicle such as an autonomous vehicle. The special-purpose computing device(s) 602 may include devices that are integrated with a vehicle and may receive sensor data from the sensors 604 via a local network connection (e.g., WiFi, Bluetooth, Dedicated Short Range Communication (DSRC), or the like). In other example embodiments, the special-purpose computing device(s) 602 may be provided remotely from a vehicle and may receive the sensor data from the sensors 604 via one or more long-range networks.

The special-purpose computing device(s) 602 may be hard-wired to perform the techniques; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 602 may also combine custom hard-wired logic, ASICs, or FPGAs with custom programming to accomplish the techniques. The special-purpose computing device(s) 602 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 620, such as iOS, Android, Chrome OS, Windows XP, Windows Vista, Windows 4, Windows 8, Windows Server, Windows CE, Unix, Linux, SunOS, Solaris, iOS, Blackberry OS, VxWorks, or other compatible operating systems. In other embodiments, the computing device(s) 602 may be controlled by a proprietary operating system. The operating system software 620 may control and schedule computer processes for execution; perform memory management; provide file system, networking, and I/O services; and provide user interface functionality, such as a graphical user interface ("GUI").

While the computing device(s) 602 and/or the sensors 604 may be described herein in the singular, it should be appreciated that multiple instances of any such component can be provided and functionality described in connection any particular component can be distributed across multiple instances of such a component. In certain example embodiments, functionality described herein in connection with any given component of the architecture 600 can be distributed among multiple components of the architecture 600. For example, at least a portion of functionality described as being provided by a computing device 602 may be distributed among multiple such computing devices 602.

The network(s) 606 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 606 can have any suitable communication range associated therewith and can include, for example, global networks (e.g., the Internet), metropolitan area networks (MANs), wide area networks (WANs), local area networks (LANs), or personal area networks (PANs). In addition, the network(s) 606 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 602 can include one or more processors (processor(s)) 608, one or more memory devices 610 (generically referred to herein as memory 610), one or more input/output ("I/O") interface(s) 612, one or more network interfaces 614, and data storage 618. The computing device 602 can further include one or more buses 618 that functionally couple various components of the computing device 602. The data storage may store one or more engines, program modules, components, or the like including, without limitation, a virtual sensor system 624 that represents a virtual simulation of the operation of one or more of the sensors 604. The virtual sensor system 624 may, in turn, include one or more engines, program modules, components, or the like including, without limitation, a predictive model 626 and a training/calibration engine 628. Each of the engines/components depicted in FIG. 6 may include logic for performing any of the processes or tasks described earlier in connection with correspondingly named engines/components. In certain example embodiments, any of the depicted engines/components may be implemented in hard-wired circuitry within digital electronic devices such as one or more ASICs or FPGAs that are persistently programmed to perform corresponding techniques.

The bus(es) 618 can include at least one of a system bus, a memory bus, an address bus, or a message bus, and can permit the exchange of information (e.g., data (including computer-executable code), signaling, etc.) between various components of the computing device 602. The bus(es) 618 can include, without limitation, a memory bus or a memory controller, a peripheral bus, an accelerated graphics port, and so forth. The bus(es) 618 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 610 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 610 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 610 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.). In example embodiments, the memory 610 may include the data storage 106(1)-106(P) and/or the data storage 120 depicted in FIG. 1. Alternatively, the data storage 106(1)-106(P) may be hard disk storage forming part of the data storage 618 and/or the data storage 120 may be a form of RAM or cache memory that is provided as part of the FOV semantics computing machine 624 itself.

The data storage 618 can include removable storage and/or non-removable storage including, but not limited to, magnetic storage, optical disk storage, and/or tape storage. The data storage 618 can provide non-volatile storage of computer-executable instructions and other data. The memory 610 and the data storage 618, removable and/or non-removable, are examples of computer-readable storage media (CRSM) as that term is used herein. The data storage 618 can store computer-executable code, instructions, or the like that can be loadable into the memory 610 and executable by the processor(s) 608 to cause the processor(s) 608 to perform or initiate various operations. The data storage 618 can additionally store data that can be copied to memory 610 for use by the processor(s) 608 during the execution of the computer-executable instructions. Moreover, output data generated as a result of execution of the computer-executable instructions by the processor(s) 608 can be stored initially in memory 610 and can ultimately be copied to data storage 618 for non-volatile storage.

More specifically, the data storage 618 can store one or more operating systems (O/S) 620 and one or more database management systems (DBMS) 622 configured to access the memory 610 and/or one or more external datastore(s) (not depicted) potentially via one or more of the networks 606. In addition, the data storage 618 may further store one or more program modules, applications, engines, computer-executable code, scripts, or the like. For instance, any of the engines/components depicted in FIG. 6 may be implemented as software and/or firmware that includes computer-executable instructions (e.g., computer-executable program code) loadable into the memory 610 for execution by one or more of the processor(s) 608 to perform any of the techniques described herein.

Although not depicted in FIG. 6, the data storage 618 can further store various types of data utilized by engines/components of the computing device 602. Such data may include, without limitation, sensor data, feedback data including historical sensor operational data, initial parameter data, or the like. Any data stored in the data storage 618 can be loaded into the memory 610 for use by the processor(s) 608 in executing computer-executable program code. In addition, any data stored in the data storage 618 can potentially be stored in one or more external datastores that are accessible via the DBMS 622 and loadable into the memory 610 for use by the processor(s) 608 in executing computer-executable instructions/program code.

The processor(s) 608 can be configured to access the memory 610 and execute computer-executable instructions/program code loaded therein. For example, the processor(s) 608 can be configured to execute computer-executable instructions/program code of the various engines/components of the FOV semantics computing machine 624 to cause or facilitate various operations to be performed in accordance with one or more embodiments of the invention. The processor(s) 608 can include any suitable processing unit capable of accepting data as input, processing the input data in accordance with stored computer-executable instructions, and generating output data. The processor(s) 608 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 608 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 608 can be made capable of supporting any of a variety of instruction sets.

Referring now to other illustrative components depicted as being stored in the data storage 618, the O/S 620 can be loaded from the data storage 618 into the memory 610 and can provide an interface between other application software executing on the computing device 602 and hardware resources of the computing device 602. More specifically, the O/S 620 can include a set of computer-executable instructions for managing hardware resources of the computing device 602 and for providing common services to other application programs. In certain example embodiments, the O/S 620 can include or otherwise control execution of one or more of the engines/program modules stored in the data storage 618. The O/S 620 can include any operating system now known or which can be developed in the future including, but not limited to, any server operating system, any mainframe operating system, or any other proprietary or non-proprietary operating system.

The DBMS 622 can be loaded into the memory 610 and can support functionality for accessing, retrieving, storing, and/or manipulating data stored in the memory 610, data stored in the data storage 618, and/or data stored in external datastore(s). The DBMS 622 can use any of a variety of database models (e.g., relational model, object model, etc.) and can support any of a variety of query languages. The DBMS 622 can access data represented in one or more data schemas and stored in any suitable data repository. Datastore(s) that may be accessible by the computing device 602 via the DBMS 622, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 602, the input/output (I/O) interface(s) 612 can facilitate the receipt of input information by the computing device 602 from one or more I/O devices as well as the output of information from the computing device 602 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 602 or can be separate therefrom. The I/O devices can further include, for example, any number of peripheral devices such as data storage devices, printing devices, and so forth.

The I/O interface(s) 612 can also include an interface for an external peripheral device connection such as universal serial bus (USB), FireWire, Thunderbolt, Ethernet port or other connection protocol that can connect to one or more networks. The I/O interface(s) 612 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 602 can further include one or more network interfaces 614 via which the computing device 602 can communicate with any of a variety of other systems, platforms, networks, devices, and so forth. The network interface(s) 614 can enable communication, for example, with the sensors 604 and/or one or more other devices via one or more of the network(s) 606. In example embodiments, the network interface(s) 614 provide a two-way data communication coupling to one or more network links that are connected to one or more of the network(s) 606. For example, the network interface(s) 614 may include an integrated services digital network (ISDN) card, a cable modem, a satellite modem, or a modem to provide a data communication connection to a corresponding type of telephone line. As another non-limiting example, the network interface(s) 614 may include a local area network (LAN) card to provide a data communication connection to a compatible LAN (or a wide area network (WAN) component to communicate with a WAN). Wireless links may also be implemented. In any such implementation, the network interface(s) 614 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 604 and the signals on network links and through the network interface(s) 614, which carry the digital data to and from the computing device 602, are example forms of transmission media. In example embodiments, the computing device 602 can send messages and receive data, including program code, through the network(s) 606, network links, and network interface(s) 614. For instance, in the Internet example, a server might transmit a requested code for an application program through the Internet, the ISP, a local network, and a network interface 614. The received code may be executed by a processor 608 as it is received, and/or stored in the data storage 618, or other non-volatile storage for later execution.

It should be appreciated that the engines depicted in FIG. 6 as part of the computing device 602 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 602 and/or hosted on other computing device(s) (e.g., 602) accessible via one or more of the network(s) 602, can be provided to support functionality provided by the engines depicted in FIG. 6 and/or additional or alternate functionality. In addition, engines that support functionality described herein can be implemented, at least partially, in hardware and/or firmware and can be executable across any number of computing devices 602 in accordance with any suitable computing model such as, for example, a client-server model, a peer-to-peer model, and so forth.

It should further be appreciated that the computing device 602 can include alternate and/or additional hardware, software, and/or firmware components beyond those described or depicted without departing from the scope of the invention. More particularly, it should be appreciated that software, firmware, and/or hardware components depicted as forming part of the computing device 602 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) 602. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being redefined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A computer-implemented method for fusing sensor data via metadata association, the method comprising:
    capturing first sensor data using a first sensor and second sensor data using a second sensor, the first sensor traversing at least a portion of a scan path that includes a 360 degree rotation;
    calibrating a set of extrinsics for the first sensor or the second sensor, the calibrated set of extrinsics including rotational or translational transformation data between the first sensor and the second sensor;
    performing, based at least in part on the calibrated set of extrinsics, a frame synchronization between the first sensor data and the second sensor data to obtain a set of synchronized frames, wherein each synchronized frame includes a portion or a frame of the first sensor data and a respective portion or a frame of the second sensor data;
    generating, based at least in part on an output of the frame synchronization, fused sensor data of the first sensor data and the second sensor data; and
    training a machine learning model or classifier based on the fused sensor data.

2. The computer-implemented method of claim 1, wherein the second sensor is positioned circumferentially around the first sensor.

3. The computer-implemented method of claim 1, wherein the frame synchronization is based on shutter times corresponding to the second sensor.

4. The computer-implemented method of claim 1, further comprising labelling the first sensor data using first bounding boxes and labelling the second sensor data using second bounding boxes.

5. The computer-implemented method of claim 4, further comprising labelling the first sensor data using first object type classifications or identifiers and labelling the second sensor data using second object type classifications or identifiers.

6. The computer-implemented method of claim 5, wherein the first object type classifications or identifiers are at least partially in common with the second object type classifications or identifiers.

7. The computer-implemented method of claim 1, wherein the first sensor data comprises three-dimensional (3D) point cloud data and the second sensor data comprises two-dimensional (2D) image data.

8. The computer-implemented method of claim 1, wherein the first sensor is of a first sensor type and the second sensor is of a second sensor type, and a plurality of sensors of the second sensor type are positioned circumferentially around the first sensor.

9. The computer-implemented method of claim 1, wherein the frame synchronization between the first sensor data and the second sensor data comprises selecting a first frame from the first sensor data and the second frame from the second sensor data based on a degree of matching between the first frame and the second frame, wherein the degree of matching between the first frame and the second frame is higher than a degree of matching between the first frame and other frames from the second sensor data and the degree of matching between the second frame and the first frame is higher than a degree of matching between the second frame and other frames from the first sensor data.

10. The computer-implemented method of claim 9, wherein the degree of matching is based on a likelihood that the first frame and the second frame contains a common object.

11. The computer-implemented method of claim 9, wherein the degree of matching is based on one or more respective object types in the first frame and the second frame, one or more respective object shapes in the first frame and the second frame, and one or more respective object locations in the first frame and the second frame.

12. A system for fusing sensor data via metadata association, the system comprising:
   at least one processor; and
   at least one memory storing computer-executable instructions, wherein the at least one processor is configured to access the at least one memory and execute the computer-executable instructions to:
      capture first sensor data using a first sensor and second sensor data using a second sensor, the first sensor traversing at least a portion of a scan path that includes a 360 degree rotation;
      calibrate a set of extrinsics for the first sensor or the second sensor, the calibrated set of extrinsics including rotational or translational transformation data between the first sensor and the second sensor;
      perform, based at least in part on the calibrated set of extrinsics, a frame synchronization between the first sensor data and the second sensor data to obtain a set of synchronized frames, wherein each synchronized frame includes a portion or a frame of the first sensor data and a respective portion or a frame of the second sensor data;
      generate, based at least in part on an output of the frame synchronization, fused sensor data of the first sensor data and the second sensor data; and
      train a machine learning model or classifier based on the fused sensor data.

13. The system of claim 12, wherein the second sensor is positioned circumferentially around the first sensor.

14. The system of claim 12, wherein the frame synchronization is based on shutter times corresponding to the second sensor.

15. The system of claim 12, wherein the at least one processor is configured to label the first sensor data using first bounding boxes and label the second sensor data using second bounding boxes.

16. The system of claim 15, wherein the at least one processor is configured to label the first sensor data using first object type classifications or identifiers and label the second sensor data using second object type classifications or identifiers.

17. The system of claim 16, wherein the first object type classifications or identifiers are at least partially in common with the second object type classifications or identifiers.

18. The system of claim 12, wherein the first sensor data comprises three-dimensional (3D) point cloud data and the second sensor data comprises two-dimensional (2D) image data.

19. The system of claim 12, wherein the first sensor is of a first sensor type and the second sensor is of a second sensor type, and a plurality of sensors of the second sensor type are positioned circumferentially around the first sensor.

20. The system of claim 12, wherein the frame synchronization between the first sensor data and the second sensor data comprises selecting a first frame from the first sensor data and the second frame from the second sensor data based on a degree of matching between the first frame and the second frame, wherein the degree of matching between the first frame and the second frame is higher than a degree of matching between the first frame and other frames from the second sensor data and the degree of matching between the second frame and the first frame is higher than a degree of matching between the second frame and other frames from the first sensor data.

* * * * *